United States Patent

Haraguchi et al.

[11] Patent Number: 5,837,740
[45] Date of Patent: Nov. 17, 1998

[54] EXPANDABLE ABS RESIN BEADS AND PROCESS FOR PRODUCING THE SAME

[75] Inventors: Kenji Haraguchi; Takanori Suzuki; Yoshinari Itoh, all of Mie, Japan

[73] Assignee: Mitsubishi Chemical BASF Company, Limited, Yokkaichi, Japan

[21] Appl. No.: 531,603

[22] Filed: Sep. 21, 1995

[30] Foreign Application Priority Data

Sep. 28, 1994 [JP] Japan .................................... 6-232857

[51] Int. Cl.$^6$ ...................................................... C08G 9/18
[52] U.S. Cl. .......................... 521/60; 428/318.8; 428/407; 521/59
[58] Field of Search .................. 521/59, 60, 56; 428/318.8, 407

[56] References Cited

U.S. PATENT DOCUMENTS 4,812,484  3/1989  Endo et al. ................................ 521/60

Primary Examiner—Morton Foelak
Attorney, Agent, or Firm—Oblon, Spivak, McClelland, Maier & Neustadt, P.C.

[57] ABSTRACT

Expandable ABS resin beads containing a volatile blowing agent are disclosed which have an internal-water content of 5% by weight or lower and, when expanded in an expansion ratio of 30, give expanded beads each having a non-expanded surface layer having a thickness of not more than 50 μm. A process for producing the expandable ABS resin beads is also disclosed which comprises dispersing ABS resin beads into an aqueous medium in a closed vessel and impregnating a volatile blowing agent into the ABS resin beads, said aqueous medium containing an electrolyte at least during the impregnation of the volatile blowing agent, with the concentration of the electrolyte in the aqueous medium being from 0.01 to 2 mol/l. The expandable resin beads are capable of giving an expanded molded article excellent in chemical resistance and toughness and especially in surface appearance and heat resistance.

6 Claims, 1 Drawing Sheet

EXPANDABLE ABS RESIN BEADS AND PROCESS FOR PRODUCING THE SAME

FIELD OF THE INVENTION

The present invention relates to expandable ABS resin beads suitable for use in producing an expanded molded article excellent in chemical resistance and toughness and especially in surface appearance and heat resistance. This invention also relates to a process for producing the expandable ABS resin beads.

BACKGROUND OF THE INVENTION

Polystyrene expanded articles not only are excellent in cushioning property and thermal insulating property but also have an advantage of easy molding. However, polystyrene expanded articles have drawbacks in that they are inferior in heat resistance, chemical resistance, and toughness. Since such drawbacks of polystyrene expanded articles can be eliminated with ABS resin expanded articles, attention is recently focused on ABS resin expanded articles as a substitute for polystyrene expanded articles.

Expanded ABS resin beads are produced, for example, by a process which comprises dispersing ABS resin beads into an aqueous medium in a closed vessel, adding a volatile blowing agent thereto, heating the contents to a temperature higher by at least 20° C. than the glass transition temperature of the ABS resin to impregnate the volatile blowing agent into the ABS resin beads, and then opening one end of the closed vessel to discharge the ABS resin beads and the aqueous medium into a region having a lower pressure than the inside of the closed vessel (see JP-A-63-77947 (corresponding to U.S. Pat. No. 4,812,484)). (The term "JP-A" as used herein means an "unexamined published Japanese patent application.") This process, however, has a drawback that an increased production cost unavoidably results because the process necessitates large-scaled equipment, and because the beads are expanded before being transported from the bead manufacturer to a bead-processing manufacturer.

On the other hand, proposed techniques for producing expandable ABS resin beads include a process in which an ABS resin having a special structure is used and a process in which the amounts of a volatile blowing agent and water contained in ABS resin beads are regulated (see JP-B-57-48380 and JP-A-50-12156). (The term "JP-B" as used herein means an "examined Japanese patent publication.")

The former process has a drawback that ABS resins usable therein are limited. The present inventors therefore investigated the latter process.

However, the latter process was found to have the following drawbacks. When ABS resin beads are dispersed into an aqueous medium and a volatile blowing agent is impregnated into the resin beads in order to produce expandable ABS resin beads according to the latter process, a large amount of water comes into the resin beads along with the volatile blowing agent. As a result, there are cases where the volatile blowing agent is not impregnated in an amount sufficient for blowing, resulting in the necessity of an increase in the amount of the volatile blowing agent to be added in an aqueous medium. However, increasing the addition amount of the volatile blowing agent tends to result in coagulation of ABS resin beads dispersed in the aqueous medium to cause a problem concerning suspension stability. Moreover, it is difficult to constantly obtain expanded beads having the same cell structure from expandable ABS resin beads having a high internal-water content, because the cell size and cell structure of the expanded beads vary considerably as the internal-water content changes with the lapse of time. In addition, even if the internal-water content of the expandable beads is reduced by heating or another means, this results in a size reduction of the cells present near the expanded-bead surface and in the formation of a thicker non-expanded layer on the expanded-bead surface. Because of these structural changes, molded articles obtained from such expanded beads have a shrunk or melted surface. Thus, an ABS expanded article having a beautiful surface appearance is unobtainable from those expanded beads.

SUMMARY OF THE INVENTION

As a result of intensive studies made by the present inventors in order to eliminate the problems described above, it has been found that expandable ABS resin beads which can be expanded to a density of 300 g/l or lower and are suitable for use in producing an ABS resin expanded article having a beautiful surface appearance can be obtained by regulating volatile blowing-agent-impregnated resin beads to have a internal-water content not higher than a certain value and by regulating the resin beads to give, when expanded in an expansion ratio of 30, expanded beads each having a non-expanded surface layer in an amount not larger than a certain value. The present invention has been completed based on this finding.

The present invention provides expandable ABS resin beads containing a volatile blowing agent, said expandable ABS resin beads having an internal-water content of 5% by weight or lower and, when expanded in an expansion ratio of 30, giving expanded beads which each has a non-expanded surface layer having a thickness of not more than 50 µm.

The internal-water content of the expandable ABS resin beads is preferably 4% by weight or lower.

The thickness of the non-expanded surface layer of each expanded bead is preferably from 10 to 30 µm.

The present invention further provides, as one method for obtaining the expandable ABS resin beads, a process which comprises dispersing ABS resin beads into an aqueous medium in a closed vessel and impregnating a volatile blowing agent into the ABS resin beads, said aqueous medium containing an electrolyte at least during the impregnation of the volatile blowing agent, with the concentration of the electrolyte in the aqueous medium being from 0.01 to 2 mol/l.

The concentration of the electrolyte in the aqueous medium is preferably from 0.03 to 1 mol/l.

The aqueous medium preferably has a temperature of from 70° to 140° C.

DETAILED DESCRIPTION OF THE INVENTION

Figure 1:
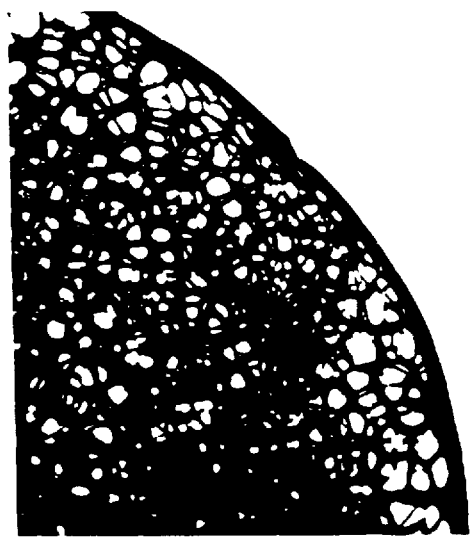
FIG. 1 is an optical photomicrograph (×50) of a section of the expanded bead obtained by expanding one of the expandable ABS resin beads of Example 1 in an expansion ratio of 30.
Figure 2:
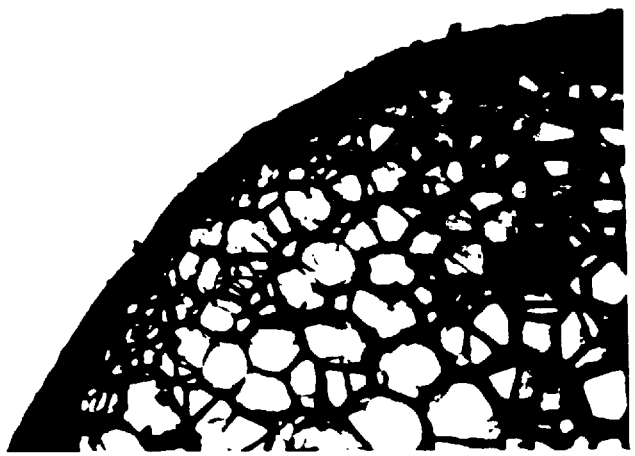
FIG. 2 is an optical photomicrograph (×50) of a section of the expanded bead obtained by expanding one of the expandable ABS resin beads of Comparative Example 3 in an expansion ratio of 30.

The expandable ABS resin beads of the present invention are expandable ABS resin beads containing a volatile blowing agent, which expandable ABS resin beads have an internal-water content of 5% by weight or lower, preferably 4% by weight or lower, and which, when expanded in an expansion ratio of 30, give expanded beads each having a non-expanded surface layer having a thickness of not more than 50 µm, preferably from 10 to 30 µm.

Too high internal-water contents in the resin beads cause a problem that the expanded molded article obtained from the resin beads has an impaired surface appearance such as a shrunk or melted surface.

Too large thicknesses of the non-expanded surface layer of the expanded beads are undesirable in that not only almost no improvement is attained in expandability or moldability, but also such expanded beads cause a problem of an impaired surface appearance such as a shrunk or melted surface of the resulting expanded molded article. On the other hand, if the thickness of the non-expanded surface layer on each expanded bead is too thin, there is a fear that melting may occur depending on steam pressure during molding. Consequently, care should be taken not to excessively dry the obtained expandable resin beads by high-temperature forced drying.

The internal-water content of beads is determined as follows. A precisely weighed portion of the beads is placed in dry methanol, and the methanol is titrated with Karl Fischer's reagent with stirring to determine the surface-water amount. Another precisely weighed portion of the beads is dissolved in dry toluene, and the toluene solution is titrated with Karl Fischer's reagent with stirring to determine the total amount of the water adherent to the expandable ABS resin beads and the water contained in the beads. The internal-water content is obtained by subtracting the surface-water amount, i.e., the amount of water adherent to the bead surface, from the total water amount.

The non-expanded surface layer in a bead expanded in an expansion ratio of 30, in this invention, means the non-expanded part which extends from the expanded-bead surface to the cells present nearest to the surface. The thickness of this part was determined by cutting out a thin section from the bead expanded in an expansion ratio of 30, measuring the thicknesses of randomly selected ten parts of the non-expanded layer on an optical photomicrograph of the section, and averaging the measured values.

Examples of the ABS resin constituting the expandable ABS resin beads of the present invention or for use in the process for producing the expandable ABS resin beads, which process will be described later, include polymers obtained by polymerizing at least one aromatic vinyl monomer selected, for example, from styrene, α-methylstyrene, vinyltoluene, t-butylstyrene, chlorostyrene, and the like with at least one vinyl cyanide monomer selected, for example, from acrylonitrile, methacrylonitrile, α-chloroacrylonitrile, and the like in the presence of a rubber-like polymer, e.g., a butadiene polymer, a copolymer of butadiene and a vinyl monomer copolymerizable therewith, an ethylene-propylene-diene copolymer, a block copolymer of butadiene and an aromatic vinyl monomer, a copolymer of an acrylic ester or a methacrylic ester and a vinyl monomer copolymerizable therewith, by emulsion polymerization, bulk polymerization, etc. In this polymerization, a monomer copolymerizable with the aromatic vinyl or vinyl cyanide monomer may be polymerized as another comonomer. Examples of the comonomer include maleic anhydride, maleic acid, itaconic acid, N-phenylmaleimide, and (meth) acrylic esters. Products on the general market may also be used.

The ABS resin may contain an inorganic filler, e.g., talc, clay, calcium carbonate, or titanium oxide, an antioxidant, an antistatic agent, an ultraviolet absorber, a lubricant, e.g., carbon black, aluminum stearate, zinc stearate, or aluminum p-t-butylbenzoate, and a flame retardant, e.g., tris (dibromopropyl) phosphate, pentabromodiphenyl ether, tetrabromobutane, dibromoethylbenzene, or 1,2,5,6,9,10-hexabromocyclodecane.

The ABS resin beads for use in this invention are particles having a size of from 0.5 to 5 mm and obtained by granulating an ABS resin by strand cutting, underwater cutting, hot cutting, etc. The shape of the beads may be spherical or cylindrical.

One process for obtaining the above-described expandable ABS resin beads of this invention comprises dispersing ABS resin beads into an aqueous medium, preferably, in the presence of a suspension stabilizer in a closed vessel and impregnating a volatile blowing agent into the ABS resin beads. In this process, the aqueous medium contains an electrolyte at least during the impregnation of the volatile blowing agent, with the concentration of the electrolyte in the aqueous medium being from 0.01 to 2 mol/l.

The suspension stabilizer for use in dispersing the ABS resin beads into an aqueous medium in this invention may be a product on the general market or may be synthesized. Examples of the suspension stabilizer include water-soluble polymers, e.g., poly(vinyl alcohol), methyl cellulose, and polyvinylpyrrolidone, and sparingly soluble inorganic salts, e.g., magnesium pyrophosphate and tricalcium phosphate. These suspension stabilizers may be used in combination with a surfactant. In the case of employing a sparingly soluble inorganic salt, this salt is preferably used in combination with an anionic surfactant, e.g., sodium dodecyl sulfate or sodium dodecylbenzenesulfonate.

The suspension stabilizer is used preferably in an amount of from 0.01 to 5.0 parts by weight per 100 parts by weight of the ABS resin beads. In the case of using a combination of a sparingly soluble inorganic salt such as the aforementioned ones and an anionic surfactant, the amounts of the sparingly soluble inorganic salt and the anionic surfactant are preferably from 0.05 to 3.0 parts by weight and from 0.0001 to 0.5 parts by weight, respectively, per 100 parts by weight of the ABS resin beads.

The electrolyte for use in the process of the present invention is not particularly limited, and any substance capable of ionizing in aqueous solution may be used. Examples thereof include inorganic salts such as lithium chloride, sodium chloride, magnesium chloride, potassium chloride, calcium chloride, ammonium chloride, sodium sulfate, magnesium sulfate, potassium sulfate, calcium sulfate, aluminum sulfate, ammonium sulfate, sodium nitrate, magnesium nitrate, potassium nitrate, calcium nitrate, ammonium nitrate, sodium carbonate, magnesium carbonate, potassium carbonate, calcium carbonate, and ammonium carbonate and water-soluble alkali metal salts of carboxylic acids such as potassium acetate, sodium acetate, sodium octanoate, sodium benzoate, and disodium succinate. Of these, the salts of alkali metals such as sodium and potassium are preferred in that such salts are effective in attaining a reduced internal-water content even when added in a small amount and are hence useful for easily obtaining the expandable ABS resin beads of this invention. In particular, sodium chloride and sodium sulfate are especially preferred in that these sodium salts are highly effective in internal-water content reduction and are suitable for industrial use because these salts are available at low cost in large quantities.

The amount of the electrolyte added to the aqueous medium is from 0.01 to 2 mol, preferably from 0.03 to 1 mol, per liter of the aqueous medium. If the concentration thereof is lower than 0.01 mol/l, the resin beads obtained cannot have a sufficiently reduced internal-water content. Even if the electrolyte concentration is increased beyond 2 mol/l, not only the effect of reducing internal-water content is not high for such a high electrolyte concentration, but also there are cases where suspension stability is impaired so significantly depending on the kind of the electrolyte that the ABS resin beads tend to coagulate.

No particular limitation is imposed on the time when the electrolyte is added. Namely, the electrolyte may be added prior to or during the impregnation of a volatile blowing agent. Usually however, the electrolyte is preferably added prior to the impregnation from the standpoint of operation.

The temperature of the aqueous medium is preferably from 70° to 140° C. from the standpoints of preventing the coagulation of ABS resin beads and facilitating the impregnation of the volatile blowing agent into the ABS resin beads.

Examples of the volatile blowing agent include organic compounds having a boiling point of 80° C. or lower, such as propane, n-butane, isobutane, n-pentane, isopentane, neopentane, cyclopentane, hexane, trichlorofluoromethane, dichlorodifluoromethane, dichlorotetrafluoroethane, chloromethane, chloroethane, dichloromethane, methanol, and diethyl ether. These compounds may be used alone or as a mixture of two or more thereof.

The volatile blowing agent is fed usually in such an amount as to yield polymer beads having a volatile blowing agent content of from 1 to 20% by weight. It is possible to enhance expandability by adding a nonvolatile plasticizer or a volatile solvent, e.g., cyclohexane, xylene, or toluene.

If the expandable ABS resin beads thus obtained are excessively dried at a high temperature over a prolonged time period, the beads tend to develop a thick non-expanded layer on the surface thereof. Accordingly, the drying of expandable ABS resin beads must be stopped in such a degree that a non-expanded layer having a thickness of more than 50 $\mu$m is not developed. The term "drying in such a degree that a non-expanded layer having a thickness of more than 50 $\mu$m is not developed" herein means a drying operation which reduces the internal-water content of the expandable beads by up to 30% of the internal-water content before the drying. For example, the ABS resin beads impregnated with a volatile blowing agent are taken out of the closed vessel and then centrifuged, following which the water adherent to the bead surface is removed with nitrogen, air, etc. to such a degree that the percent decrease of internal-water content resulting from the final step does not exceed 30%. The percent decrease of internal-water content means the proportion of the reduced internal-water amount caused by the drying with nitrogen, air, etc. to the amount of internal water immediately after the centrifuging of the ABS resin beads impregnated with a volatile blowing agent.

The present invention will be explained below in more detail by reference to the following Examples and Comparative Examples, but the invention should not be construed as being limited to these Examples only.

EXAMPLE 1

An ABS resin feedstock having a monomer composition of styrene/butadiene/acrylonitrile=62.9/14.6/22.5 (weight ratio), an average rubber particle diameter of 0.14 $\mu$m, and a softening temperature of 102° C. was melted with a 30-mm single-screw extruder, and then granulated with an underwater cutting die to obtain ABS resin beads weighing 1.2 mg per bead.

To synthesize magnesium pyrophosphate, 4.0 g of sodium phosphate, 8.0 g of magnesium sulfate, and 900 g of ion-exchanged water were introduced into a 3-liter autoclave equipped with a stirrer. Subsequently, 0.45 g of sodium dodecyl sulfate, 27 g of sodium chloride, and 600 g of ABS resin beads were introduced. The concentration of the electrolytes which consisted of sodium chloride and sodium sulfate was 0.54 mol/l in the ion-exchanged water. Sodium sulfate was the by-product in synthesizing magnesium phosphate. After the contents were heated to 120° C. over a period of 1 hour, 66 g of pentane was added. The resulting mixture was maintained at 120° C. for 10 hours and then cooled to room temperature.

The expandable ABS resin beads obtained were taken out of the autoclave, and the magnesium pyrophosphate adherent to the bead surface was dissolved away with nitric acid. The expandable beads were washed with water and then centrifuged. Subsequently, the expandable ABS resin beads were placed in a cylindrical metal vessel having an inner diameter of 10 cm and a height of 25 cm and fitted on its bottom and top sides with a metal netting having an opening size of 0.1 mm. Dry nitrogen having a temperature of 20° C. was blown into the cylindrical vessel from its bottom at a rate of 500 l/min for 10 minutes to dry the beads.

The expandable ABS resin beads thus dried were mixed in an amount of 100 parts by weight with 0.2 parts by weight of zinc stearate, 0.1 part by weight of a glycerine stearate, and 0.01 part by weight of a bis(hydroxyethyl)alkylamine to coat the individual beads with these ingredients. The coated beads were introduced into a batch pre-expander equipped with a stirrer, and steam was blown thereinto at a pressure of 1.0 kgf/cm$^2$ to thermally expand the beads in an expansion ratio of 30. Thus, expanded ABS resin beads were obtained.

The expanded beads thus obtained were filled into a mold and heated with steam for 15 seconds at a steam pressure of 0.8 kgf/cm$^2$ to obtain an expanded molded article.

The following methods were used to evaluate the ABS resin for rubber particle diameter and softening temperature, to evaluate the expandable resin beads obtained by the method described above for internal-water content, the percent decrease of internal-water content, non-expanded-layer thickness and volatile content, and to evaluate the expanded molded article for surface appearance and heat resistance.

Measurement of Rubber Particle Diameter of ABS Resin: The diameters of a hundred to two hundreds of rubber particles were measured on a photograph taken with a TEM, and the average thereof was calculated using the following equation.

Average particle diameter=$\Sigma NiD^2/\Sigma NiD$

Softening Temperature: Vicat softening temperature measured in accordance with JIS K7206 (1993).

Internal-water Content: A precisely weighed portion of the beads was placed in dry methanol, and the methanol was titrated with Karl Fischer's reagent with stirring to determine the surface-water amount. Another precisely weighed portion of the beads was dissolved in dry toluene, and the toluene solution was titrated with Karl Fischer's reagent with stirring to determine the total amount of the water adherent to the expandable ABS resin beads and the water contained in the beads. The internal-water content was obtained by subtracting the surface-water amount, i.e., the amount of water adherent to the bead surface, from the total water amount.

Percent Decrease of Internal-water Content: The internal-water content of the ABS resin beads impregnated with the volatile blowing agent was measured by the above-described method immediately after centrifuging and after drying with nitrogen, air, etc., and the difference between the thus-obtained two values of internal-water content was divided by the former value.

Thickness of Non-expanded Layer: A thin section was cut out from an expanded bead, and the thicknesses of randomly selected ten parts of the non-expanded layer were measured on an optical photomicrograph of the section and averaged.

Measurement of Volatile Content: A weighed sample was heated at 120° C. for 4 hours, and then weighed again. The volatile content was calculated from the weight change resulting from the heating.

Surface Appearance: The surface appearance of the expanded molded article was visually evaluated based on the following criteria.

○; The molding has almost no shrunk or melted surface and almost no gaps.

Δ; A shrunk or melted surface or gaps are observed.

x; A considerably shrunk or melted surface or considerable gaps are observed.

Heat Resistance: The expanded molded article was cut into a test piece having dimensions of 50×50×25 mm, and heated at 90° C. for 22 hours. Test pieces which showed a degree of deformation lower than 1% through the heating are indicated by ○, and test pieces showing a degree of deformation of 1% or higher are indicated by x.

EXAMPLE 2

The same procedure as in Example 1 was carried out, except that an ABS resin having a monomer composition of styrene/butadiene/acrylonitrile=62.8/15.0/22.2 (weight ratio), an average rubber particle diameter of 0.21 μm, and a softening temperature of 97° C. was used as a feedstock.

EXAMPLE 3

The same procedure as in Example 1 was carried out, except that an ABS resin having a monomer composition of styrene/butadiene/acrylonitrile=62.0/15.1/22.9 (weight ratio), an average rubber particle diameter of 0.20 μm, and a softening temperature of 100° C. was used as a feedstock.

EXAMPLE 4

The same procedure as in Example 1 was carried out, except that an ABS resin having a monomer composition of styrene/butadiene/acrylonitrile=61.2/16.5/22.3 (weight ratio), an average rubber particle diameter of 0.30 μm, and a softening temperature of 95° C. was used as a feedstock.

EXAMPLE 5

Into a 3-liter autoclave were introduced 600 g of the same ABS resin beads as used in Example 1, 900 g of ion-exchanged water, 4.5 g of tricalcium phosphate, 0.045 g of sodium dodecylbenzenesulfonate, and 45 g of sodium chloride. The subsequent procedure was carried out in the same manner as in Example 1. The concentration of the electrolyte in the aqueous medium was 0.85 mol/l.

EXAMPLE 6

Into a 3-liter autoclave were introduced 600 g of the same ABS resin beads as used in Example 1, 900 g of ion-exchanged water, 4.0 g of sodium pyrophosphate, 8.0 g of magnesium sulfate, and 0.45 g of sodium dodecyl sulfate. The subsequent procedure was carried out in the same manner as in Example 1. The concentration of the electrolytes in the aqueous medium was 0.03 mol/l.

EXAMPLE 7

Into a 3-liter autoclave were introduced 600 g of the same ABS resin beads as used in Example 4, 900 g of ion-exchanged water, 4.0 g of sodium pyrophosphate, 8.0 g of magnesium sulfate, 0.45 g of sodium dodecyl sulfate, and 9 g of sodium sulfate. The subsequent procedure was carried out in the same manner as in Example 1. The concentration of the electrolytes in the aqueous medium was 0.10 mol/l.

EXAMPLE 8

The same procedure as in Example 1 was carried out, except that the amount of sodium chloride was changed to 63 g. The concentration of the electrolytes in the aqueous medium was 1.22 mol/l.

COMPARATIVE EXAMPLE 1

The same procedure as in Example 1 was carried out, except that 600 g of the same ABS resin beads as used in Example 1 were introduced into a 3-liter autoclave along with 900 g of ion-exchanged water, 4.5 g of tricalcium phosphate, and 0.045 g of sodium dodecylbenzenesulfonate.

COMPARATIVE EXAMPLE 2

The same procedure as in Example 1 was carried out, except that 600 g of the same ABS resin beads as used in Example 1 were introduced into a 3-liter autoclave along with 900 g of ion-exchanged water, 4.5 g of tricalcium phosphate, and 0.045 g of sodium dodecylbenzenesulfonate, and except that the addition amount of pentane was changed to 150 g. The ABS resin beads taken out from the autoclave after impregnation of the volatile blowing agent were found to have been lightly coagulated. Hence, the ABS resin beads partially coagulated were separated into individual beads by hand, before being subjected to the subsequent treatments (pickling, drying, etc.), expansion, and molding.

COMPARATIVE EXAMPLE 3

The expandable ABS resin beads obtained in Comparative Example 2 were dried in a 50° C. nitrogen stream for 60 minutes to reduce the internal-water content of the beads.

Table 1 summarizes electrolyte concentration and drying condition for each of the Examples and Comparative Examples given above, the volatile content and internal-water content of each expandable resin bead sample obtained, the percent decrease of internal-water content, the thickness of non-expanded layer and the surface appearance and heat resistance of each expanded molded article.

The results given in Table 1 show that the expandable ABS resin beads according to the present invention (Examples 1 to 8) had excellent expandability and excellent moldability regardless of the softening temperature of the feedstock ABS resin. In contrast, in the case of the expandable ABS resin beads having too high an internal-water content, the amount of the volatile blowing agent impregnated thereinto was too small to impart satisfactory expandability and moldability to the expandable beads (Comparative Example 1). In the case of the expandable ABS resin beads whose internal-water content had been reduced by forced drying at an elevated temperature, impregnation of a larger amount of the volatile blowing agent was necessary to sufficient expansion, so that not only the ABS resin beads tended to coagulate during the impregnation of the volatile blowing agent but also a poor surface appearance resulted (Comparative Example 3).

TABLE 1

|  |  | Example |  |  |  |  |  |  |  | Comparative Example |  |  |
|---|---|---|---|---|---|---|---|---|---|---|---|---|
|  |  | 1 | 2 | 3 | 4 | 5 | 6 | 7 | 8 | 1 | 2 | 3 |
| Resin Composition | AN content, wt % | 22.5 | 22.2 | 22.9 | 22.3 | 22.5 | 22.5 | 22.3 | 22.5 | 22.5 | 22.5 | 22.5 |
|  | Rubber content, wt % | 14.6 | 15.0 | 14.6 | 14.6 | 14.6 | 14.6 | 14.6 | 14.6 | 14.6 | 14.6 | 14.6 |
|  | Average rubber particle diameter, μm | 0.14 | 0.21 | 0.20 | 0.30 | 0.14 | 0.14 | 0.30 | 0.14 | 0.14 | 0.14 | 0.14 |
| Production Condition | Electrolyte concentration, mol/l | 0.54 | 0.54 | 0.54 | 0.54 | 0.85 | 0.03 | 0.10 | 1.22 | 0.0 | 0.0 | 0.0 |
|  | Drying condition 500 l/min | 20° C. nitrogen 10 min | 20° C. nitrogen 10 min | 20° C. nitrogen 10 min | 20° C. nitrogen 10 min | 20° C. nitrogen 10 min | 20° C. nitrogen 10 min | 20° C. nitrogen 10 min | 20° C. nitrogen 10 min | 20° C. nitrogen 10 min | 20° C. nitrogen 10 min | 50° C. nitrogen 60 min |
| Expandable Beads | Percent decrease of internal-water content, % | 8.3 | 4.1 | 9.4 | 7.4 | 6.7 | 7.0 | 6.7 | 4.8 | 7.5 | 7.3 | 89.2 |
|  | Volatile content, wt % | 7.5 | 7.9 | 8.1 | 7.9 | 7.3 | 7.0 | 6.4 | 7.7 | 4.3 | 8.6 | 6.9 |
|  | Internal-water content, wt % | 1.1 | 0.7 | 2.9 | 2.5 | 1.4 | 4.0 | 1.4 | 0.6 | 8.6 | 8.9 | 1.9 |
|  | Thickness of non-expanded layer, μm | 25 | 2 | 1 | 5 | 25 | 2 | 5 | 30 | —*1 | 20 | 80 |
| Evaluation | Surface appearance | ○ | ○ | ○ | ○ | ○ | ○ | ○ | ○ | x | Δ | x |
|  | Heat resistance | ○ | ○ | ○ | ○ | ○ | ○ | ○ | ○ | —*2 | ○ | ○ |

*1 incapable of expanding to an expansion ratio of 30.
*2 unable to be evaluated because of no moldability.

The expanded molded articles obtained from the expandable ABS resin beads of the present invention have an exceedingly good surface appearance and excellent heat resistance.

While the invention has been described in detail and with reference to specific embodiments thereof, it will be apparent to one skilled in the art that various changes and modifications can be made therein without departing from the spirit and scope thereof.

What is claimed is:

1. Expandable ABS resin beads containing a volatile blowing agent, said expandable ABS resin beads having an internal-water content of 5% by weight or lower and, when expanded in an expansion ratio of 30, giving expanded beads which each has a non-expanded surface layer having a thickness of not more than 50 μm.

2. The expandable ABS resin beads as claimed in claim 1, wherein the internal-water content of the expandable ABS resin beads is 4% by weight or lower.

3. The expandable ABS resin beads as claimed in claim 1, wherein the thickness of the non-expanded surface layer of each expanded bead is from 10 to 30 μm.

4. A process for producing expandable ABS resin beads which comprises dispersing ABS resin beads into an aqueous medium in a closed vessel and impregnating a volatile blowing agent into the ABS resin beads, said aqueous medium containing an electrolyte at least during the impregnation of the volatile blowing agent, with the concentration of the electrolyte in the aqueous medium being from 0.01 to 2 mol/l.

5. The process for producing expandable ABS resin beads as claimed in claim 4, wherein the concentration of the electrolyte in the aqueous medium is from 0.03 to 1 mol/l.

6. The process for producing expandable ABS resin beads as claimed in claim 4, wherein the aqueous medium has a temperature of from 70° to 140° C.

* * * * *